Sept. 17, 1929.  G. BLACKSTOCK  1,728,325
CHANGE GEAR DEVICE
Filed March 17, 1928
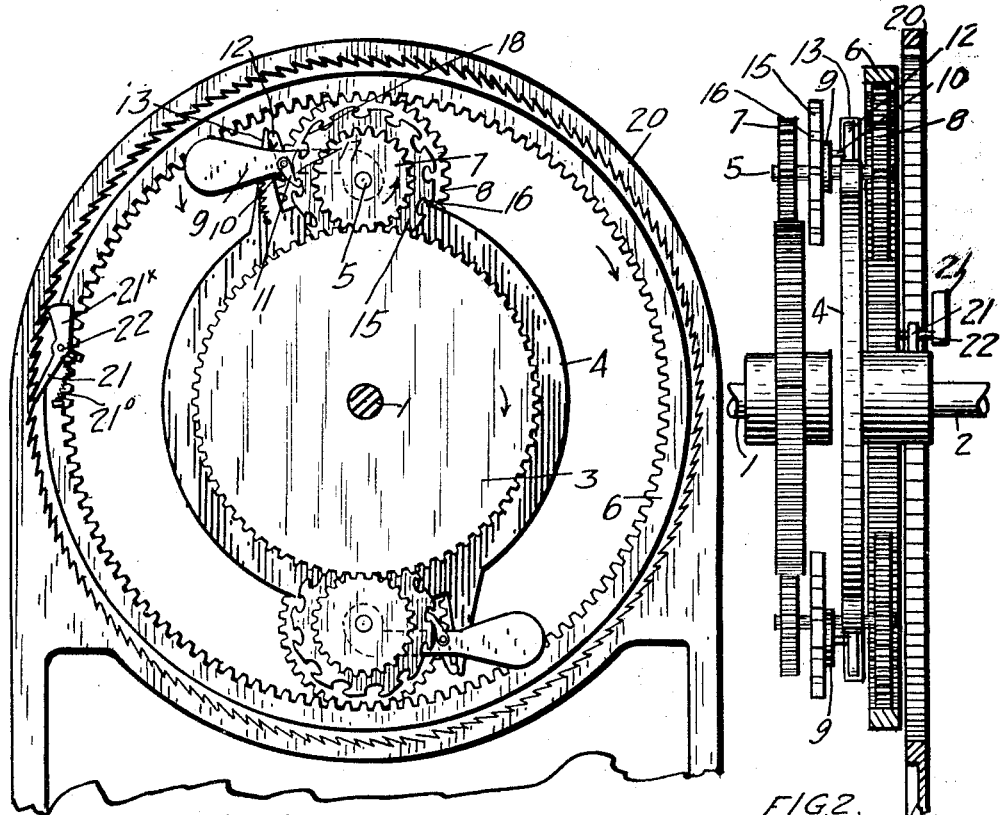
FIG.1.
FIG.2.
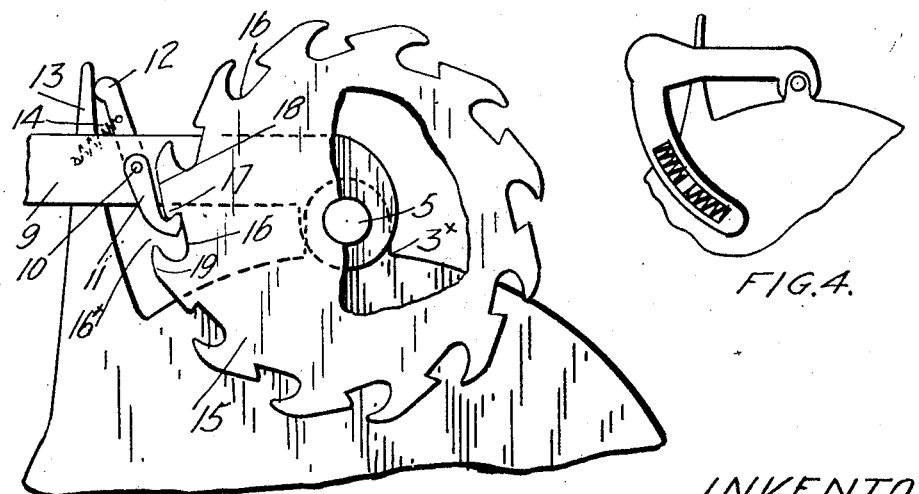
FIG.3.
FIG.4.
INVENTOR
G. BLACKSTOCK
BY
ATTORNEYS.

Patented Sept. 17, 1929

1,728,325

UNITED STATES PATENT OFFICE

GIBBS BLACKSTOCK, OF TORONTO, ONTARIO, CANADA

CHANGE-GEAR DEVICE

Application filed March 17, 1928. Serial No. 262,434.

My invention relates to improvements in change gear devices, and the object of the invention is to devise means for automatically changing gear controlled by change in load and the speed of the engine, thereby relieving the operator of work, eliminating noise and crash in gear changing, increasing to higher speed more easily and quickly, which will automatically change into low when needed on ascending hills, and by which a quick get away is provided in traffic, and it consists essentially of the arrangement and construction of parts as hereinafter more particularly explained.

Fig. 1 is a face elevation of my device with the engine or drive shaft in section.

Fig. 2 is a side elevation of the parts shown in Fig. 1 the exterior annular gear being in section.

Fig. 3 is an enlarged detail of the locking pawl and coacting parts.

Fig. 4 is an alternative construction of spring support for the weights.

In the drawing like characters of reference indicate corresponding parts in each figure.

1 indicates the engine shaft and 2 the driven shaft. 3 is a gear secured to the engine shaft. 4 is a disc secured to the driven shaft. 5 are short shafts mounted in bearings $3^x$ forming part of the disc 4. 6 is a floating ring provided with an annular internal gear. 7 is a gear mounted on each shaft 5 and meshing with the gear 3 of the engine shaft. 8 is a gear mounted on the opposite end of each shaft 5 and meshing with the gear ring 6. 9 is a weighted arm swung freely on each shaft 5 and in which is journalled a rocking shaft 10 on which is secured a pawl 11. 12 is a cam finger also secured to the shaft 10 and coacting with a cam projection 13 carried by the disc 4 and spring held thereagainst by a suitable spring 14. 15 is a wheel having peripheral notches 16 forming a shoulder 17 with which the pawl 11 engages.

The periphery of the wheel is inclined inward towards the shoulder as indicated at 18 so that when the wheel 15 is rotated clockwise the spring pressed pawl 11 will be carried into the notch through the notch opening $16^x$ and lock the wheel and parts connected thereto from rotation, the periphery of the wheel at the opposite side of the notch opening being curved beyond the normal periphery of the wheel as indicated at 19 so that when the wheel is rotated counter clockwise the spring pressed pawl 11 will be carried over the opening $16^x$ so that it will not engage the notch and lock the wheel and parts connected thereto from rotation.

20 is an internal stationary ratchet gear. 21 is a dog engaging therewith such dog being pivotally mounted as indicated at 22 on the annular gear 6. The dog 21 is provided with a weight $21^x$ and a tension spring $21^o$ by which it is carried in and out of engagement with the teeth of the annular ratchet gear 20.

Having described the principal parts involved in my invention I will briefly describe the operation of the same.

It is assumed that all the parts are stationary and in their normal position.

Upon starting the engine the engine shaft 1 and gear 3 are rotated in the direction of arrow or clockwise, and thereby rotating the gear 7 in a counter clockwise direction as indicated by arrow. The shaft 5 to which the gear 7 is secured is turned in the same direction carrying the wheel 15 and the weighted arm 9, which is locked to the wheel by the pawl 11, in the same direction, that is, inward. By this action the free end of the cam finger 12 is carried against the projection 13 which is held stationary by the inertia of the parts or the load.

The pressure of the finger 12 against the projection 13 swings the cam finger inward rocking the shaft 10 in the same direction and swings the pawl 11 which is also secured to shaft 10 outward out of engagement with the wheel 15 which is thereby freed.

It will be noted that the gear ring 6 is held stationary from moving in a counter clockwise direction by the dog 21 engaging the ratchet 20. It will therefore be seen that as soon as the wheel 15 is unlocked as above described that the rotation of the gear 7, shaft 5 and gear 8 which are one gear unit will tend to force the gear 6 in a counter clockwise direction, such movement being prevented by the dog 21 engaging the ratchet 20. The counter clockwise movement of the gear 6 being prevented, the gear 8 will in consequence when rotated travel in a clockwise direction around the internal gear of the gear ring 6 carrying the disc 4 in the same direction, and thereby transmitting motion to the driven shaft 2 to which the disc 4 is connected producing a reduced ratio or approximately a 2 to 1 ratio between the driving shaft 1 and driven shaft 2 or a low gear drive.

The speed of rotation carries the weighted arms 9 again outward into the position shown in the drawing, the pawl 11 travelling freely around the periphery of the wheel 15 but spring pressed thereagainst.

In order to change from low to high gear the engine is slowed down. The momentum of the load maintains the speed of the driven shaft 2 and disc 4. When the engine speed reaches that of the driven shaft and tends to fall momentarily below it reverse rotation is given to the gear 7 and wheel 15 so that the end of the pawl 11 passes down the incline 18 into the notch 16 to engage the shoulder 17.

The engine is then gradually speeded up the pawl remaining in its engaged position so that the gear 7, shaft 5, wheel 15, gear 8, arm 9 and gear ring 6 are locked as one unit traveling with the gear 3 and shaft 1 so that the transmission shaft 2 is driven at engine speed from the engine shaft. The dog 21 travels in a clockwise direction around the ratchet gear 20 and is freed therefrom by centrifugal force acting on the weight 21$^x$.

The change from high to low gear occurs automatically when torque about the shaft 5 due to driving thrust is sufficient, as say when climbing a hill, to overcome the opposing torque about shaft 5 due to the centrifugal action of the weighted arm 9 which is then swung inward and the pawl 11 released from the wheel 15, freeing the gears 7 and 8 to operate as reducing gears between the engine shaft gear 3 and gear ring 6.

Simultaneously the checking of the speed of the gear 6 causes the weight 21$^x$ by its momentum to travel inward and thereby carry the dog 21 into engagement with the ratchet 20 so that the mechanism operates at low or reduced gear as above described.

What I claim as my invention is:—

1. In a change speed device, the combination with the drive and driven shafts, of an external gear carried by the drive shaft, an internal floating gear ring free to rotate in the direction of rotation of the engine shaft, a gear drive interposed between the external and internal gears and carried by the driven shaft, means for locking the gear ring from rotation in a direction opposite to the direction of the drive shaft, a weighted arm releasably connected to the interposed gear drive to hold the gear drive stationary by centrifugal action, and means operated by increase of driving torque for releasing the connection between the arm and the interposed gear.

2. In a change speed device, the combination with the drive and driven shafts, of a gear secured to the drive shaft, an annular internal gear capable of rotation in one direction only, and gears interposed between the gear of the drive shaft and annular gear, a shaft carried by the driven shaft to which the interposed gear is secured, a notched wheel also secured to the shaft of the interposed gears, a weighted arm swung upon the shaft, a spring pressed pawl carried by the arm and adapted to engage the notches of the wheel when the wheel is turned in one direction and to ride clear of such notches when the wheel is turned in the opposite direction, and means coacting with the inward swing of the weighted arm for releasing the pawl.

3. In a change gear device, the combination with a driving and driven shaft, and an internally geared annulus free to travel only in the direction of the drive shaft, of a reduction drive between said shafts comprising a gear connection carried by the driven shaft between the drive shaft and annulus, a latching device to positively hold the reduction drive from rotation, means operated by centrifugal action to maintain the latching device in engagement, and means for releasing the latch actuated by the torque generated in the reduction drive adapted to re-engage by the reduction of the driving shaft speed approximately to the speed of the driven shaft.

4. In a change speed device, the combination with a drive and driven shaft, and an internally geared annulus free to travel only in the direction of the driving shaft, of a reduction drive between said shafts comprising a gear connection carried by the driven shaft between the drive shaft and annulus, a notched wheel rotating with such gear connection, a free weighted arm pivotally carried by such gear connection, a latch pawl pivoted upon the arm and held in engagement with the notched wheel by the arm as it is carried outward by centrifugal action, and means for releasing the pawl actuated by the torque on said gear connection adapted to re-engage as the speed of the driving shaft is reduced approximately to the speed of the driven shaft.

5. In a change gear device, the combination with a drive and a driven shaft, and a reduction gear connection therebetween, of a rotatable member driven from the drive shaft, a driven member secured to the driven shaft, a radially movable weight carried on the driven member, a locking member carried by the weight, said locking member being held in positive engagement with the rotatable member to positively lock the drive and driven shafts together by the weight held outward by centrifugal action and means coacting with the inward movement of the weight due to load counteracting such centrifugal action for releasing the locking member, and re-engaging when the speed of the drive shaft is reduced to that of the driven shaft and a ratchet and dog controlled device against which the reduction gear reacts when the locking member is released from the rotatable member and against which reaction automatically ceases when the locking member engages the rotatable member.

6. In a change gear device, the combination with a drive and driven shaft, of a driving connection therebetween comprising a notched wheel driven from the drive shaft, a pawl carrier secured to the driven shaft, a weight carried on the pawl carrier to move radially, a spring pressed pawl carried by the weight and coacting with the notched wheel and held in engagement by the weight held outward by centrifugal action, and pawl releasing means carried by the carrier and coacting with the weight to release the pawl as the weight is moved inward by the load counteracting the aforesaid centrifugal action and a ratchet and dog controlled reaction member against which the reduction gear reacts when the pawl disengages the notched wheel and against which reaction automatically ceases when the pawl disengages the notched wheel.

7. In a change gear device, the combination with a drive and driven shaft, of a driving connection therebetween comprising a notched wheel driven from the drive shaft, a pawl carrier secured to the driven shaft, a weight carried on the pawl carrier to move radially, a spring pressed pawl carried by the weight and coacting with the notched wheel and held in engagement by the weight held outward by centrifugal action, and pawl releasing means coacting with the weight to release the pawl when the weight is moved inward by the load as it counteracts the aforesaid centrifugal action, the pawl being adapted to re-engage by the reduction of the speed of the driving shaft to the speed of the driven shaft and a ratchet and dog controlled reaction member against which the reduction gear reacts when the pawl disengages the notched wheel and against which reaction automatically ceases when the pawl disengages the notched wheel.

8. In a change gear device, the combination with a drive and driven shaft and a reduction gear connection therebetween, of a notched wheel driven from the drive shaft, a pawl carrier secured to the driven shaft, a weight carried on the carrier to move radially, a spring pressed pawl carried by the weight and coacting with the notched wheel and held in engagement by the weight held outward by centrifugal action and pawl releasing means coacting with the weight to release the pawl when the weight is moved inward by the load counteracting the aforesaid centrifugal action, said pawl being adapted to re-engage when the speed of the driving shaft is reduced to the speed of the driven shaft, and a ratchet and dog controlled reaction member against which the reduction gear reacts when the pawl disengages the notched wheel and against which reaction automatically ceases when the pawl disengages the notched wheel.

9. In a change gear device, the combination with the drive and driven shaft, of a releasable direct drive connection between the drive and driven shaft comprising a rotatable member driven from the drive shaft, a driven member secured to the driven shaft, a radially movable weight carried on the driven member, a locking member coacting with the weight adapted to engage the rotatable member when the speed of the drive shaft is reduced to that of the driven shaft and to be held in engagement by the weight held outward by centrifugal action to positively lock the drive and driven shafts together, means for releasing the locking member when the weight moves inward owing to the counteraction of centrifugal action by the load, and a reduction gear connection comprising a gear secured to the drive shaft, an internally geared annulus free to revolve only in the same direction as the drive shaft, and gears carried on the driven member between the gear on the drive shaft and the annulus.

10. In a change gear device, the combination with the drive and driven shaft, of a releasable direct drive connection between the drive and driven shaft comprising a notched wheel driven from the drive shaft and a driven member secured to the driven shaft, a radially movable weight carried on the driven member, a pawl coacting with the weight adapted to engage the notched wheel when the speed of the drive shaft is reduced to that of the driven shaft and to be held in engagement by the weight held outward by centrifugal action to positively lock the drive and driven shafts together, means for releasing the pawl when the weight moves inward owing to the counteraction of the centrifugal action by the load, and a reduction gear connection comprising a gear secured to the drive shaft, an internally geared annulus free to revolve only in the same direction as the drive shaft and gears carried on the driven member between the gear on the drive shaft and the annulus.

11. In a change gear device, the combination with the drive and driven shaft, of a driving connection therebetween comprising a notched wheel driven from the drive shaft, a pawl carrier secured to the driven shaft, a weight carried on the pawl carrier to move radially, a spring pressed pawl coacting with the weight and with the notched wheel, engaging when the speed of the drive shaft is reduced to that of the driven shaft and held in engagement by the weight held outward by centrifugal action, pawl releasing means carried by the carrier coacting with the weight to release the pawl as the weight is moved inward by the load conteracting the aforesaid centrifugal action, and a ratchet and dog controlled re-action member against which the reduction gear re-acts when the pawl disengages the notched wheel and against which the re-action automatically ceases when the pawl disengages the notched wheel.

12. In a change gear device, the combination with the drive and driven shaft, and a releasable direct drive connection therebetween, of a reduction gear system comprising a gear secured to the drive shaft, an internal floating ring gear, gears carried on the driven shaft between the ring gear and drive shaft gear, a fixed ratchet rack adjacent to the ring gear, and a spring pressed dog pivoted on the ring gear to engage the ratchet rack and prevent rotation of the ring gear in a direction opposite to the drive shaft, the aforesaid dog being so weighted that when the ring gear is in motion the dog is held clear of the ratchet rack by centrifugal action and when the ring gear is negatively accelerated the relative forward motion of the weighted part tends to force the point of the dog against the ratchet rack.

13. In a change gear device, the combination with a drive and a driven shaft, and a low gear train of the planetary type provided with a floating reaction gear capable of rotation only in the normal forward direction of the drive shaft, of releasable means for directly connecting the drive and driven shafts together, comprising adjacent driving and driven members connected respectively with the drive and driven shafts and an interposed locking device to engage and lock such members together as the speeds of the shafts are equalized, a movable weight connected to the locking device to hold it in engagement by centrifugal action, and means for releasing the locking device actuated by inward movement of the weight due to excessive load on the drive shaft.

14. In a change gear device of the type described, the combination with the drive and driven shafts, and a low gear drive therebetween, of a high gear drive in which is incorporated a releasable connection comprising, a driving member driven from the driving shaft and a driven member to transmit motion to the driven shaft and an interposed locking device adapted to engage and lock the said members together when their motion relative to each other ceases, a movable weight connected with the locking device and adapted to revolve with one of the parts of the high gear drive and so mounted as to be subject to centrifugal force and an inward force due to load, means actuated by the inward movement of the weight for releasing the locking device, and means coacting with the freed high gear drive to form the low gear drive connection between the drive and driven shafts.

15. In a change gear device, a reduction gear system, a floating reaction member incorporated in the reduction gear system, means for preventing the reverse rotation of the reaction member comprising an adjacent fixed member and a locking member on the reaction member so weighted that the weighted part tends by its centrifugal action to hold the locking member clear of the fixed member when in motion and by its momentum tends to carry the locking member into engagement with the fixed member when the reaction member is rapidly checked in motion.

GIBBS BLACKSTOCK.